US012769575B2

(12) United States Patent
Shiraishi et al.

(10) Patent No.: US 12,769,575 B2
(45) Date of Patent: Oct. 20, 2026

(54) RESOURCE MANAGEMENT DEVICE, METHOD, AND COMPUTER PROGRAM FOR RESOURCE MANAGEMENT AND MATCHING OUTPUT TIMINGS OF SEQUENTIAL PROCESSES ACROSS HARDWARE

(71) Applicant: TOYOTA JIDOSHA KABUSHIKI KAISHA, Toyota (JP)

(72) Inventors: Shinichi Shiraishi, Saitama (JP); Yu Sasaki, Tokyo-to (JP); Kazunao Yokoo, Misato (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 421 days.

(21) Appl. No.: 18/383,140

(22) Filed: Oct. 24, 2023

(65) Prior Publication Data

US 2024/0220302 A1 Jul. 4, 2024

(30) Foreign Application Priority Data

Jan. 4, 2023 (JP) ................................ 2023-000186

(51) Int. Cl.
*G06F 9/455* (2018.01)
*G06F 9/50* (2006.01)

(52) U.S. Cl.
CPC ........ *G06F 9/45558* (2013.01); *G06F 9/5005* (2013.01); *G06F 9/5044* (2013.01); *G06F 2009/4557* (2013.01); *G06F 2009/45583* (2013.01); *Y02D 10/00* (2018.01)

(58) Field of Classification Search
None
See application file for complete search history.

(56) References Cited

U.S. PATENT DOCUMENTS

| | | | | |
|---|---|---|---|---|
| 2009/0292818 | A1* | 11/2009 | Blount .................... | G06F 18/00 709/231 |
| 2012/0254604 | A1* | 10/2012 | Craik .................... | G06F 9/5066 713/100 |
| 2013/0159596 | A1* | 6/2013 | Van De Ven ......... | G06F 12/109 711/6 |
| 2014/0089929 | A1* | 3/2014 | Branson .................. | H04L 67/10 718/102 |
| 2017/0286342 | A1* | 10/2017 | Derler ................... | G06F 9/5066 |
| 2019/0042398 | A1 | 2/2019 | Prasad et al. | |
| 2019/0370630 | A1* | 12/2019 | Yang ...................... | G06N 3/105 |

(Continued)

FOREIGN PATENT DOCUMENTS

| | | | |
|---|---|---|---|
| JP | H11-15693 | A | 1/1999 |
| JP | 2013-214146 | A | 10/2013 |
| JP | 2019-029015 | A | 2/2019 |

*Primary Examiner* — Abu Zar Ghaffari
(74) *Attorney, Agent, or Firm* — Oliff PLC

(57) ABSTRACT

A resource management device includes a processor configured to determine allocation of a resource of first hardware to sequential processes so that the sum of an absolute value of a difference between an output timing of at least one predetermined-number process among the sequential processes for the case where the first hardware executes the sequential processes and an output timing of the predetermined-number process for the case where second hardware that underperforms the first hardware executes the sequential processes is within a predetermined tolerance.

5 Claims, 5 Drawing Sheets

(56) References Cited

U.S. PATENT DOCUMENTS

| | | | | |
|---|---|---|---|---|
| 2021/0390495 | A1* | 12/2021 | Upadhyay | G06F 9/5016 |
| 2022/0129307 | A1* | 4/2022 | Strenski | G06F 9/4881 |
| 2023/0103826 | A1* | 4/2023 | Tramble | G06F 9/4881<br>718/104 |
| 2023/0145437 | A1* | 5/2023 | Costa | G06F 9/4887<br>718/107 |
| 2024/0015080 | A1* | 1/2024 | Illikkal | G06F 9/5011 |
| 2024/0113882 | A1* | 4/2024 | Douglas | H04L 9/3273 |

* cited by examiner

E=|outh[5]−outl[5]|

E=|outh[1]−outl[1]|+|outh[5]−outl[5]|

$E=\sum_i |outh[i]-outl[i]|$

RESOURCE MANAGEMENT DEVICE, METHOD, AND COMPUTER PROGRAM FOR RESOURCE MANAGEMENT AND MATCHING OUTPUT TIMINGS OF SEQUENTIAL PROCESSES ACROSS HARDWARE

FIELD

The present invention relates to a resource management device, a method, and a computer program for resource management of hardware to be allocated to predetermined processes.

BACKGROUND

A technique has been proposed for efficient use of a central processing unit (CPU) resource of a virtual computer system in a fully virtualized environment (see Japanese Unexamined Patent Publication JP2013-214146A).

In a virtual computer system disclosed in JP2013-214146A, a hypervisor calculates a usage rate of a CPU allocated to a virtual machine, based on a Halt (HLT) instruction from a guest operating system, and determines the length of time during which the CPU is allocated to the virtual machine, based on the calculated usage rate of the CPU.

SUMMARY

To increase the efficiency of development of software, it is desirable that output of the software be independent of hardware. In particular, when software that runs on particular hardware is made to run as part of a software application under development on other hardware that is more highly specified than the particular hardware, it is desirable that output of the software be unchanged from output for the case where the software runs on the particular hardware.

It is an object of the present invention to provide a resource management device that can appropriately allocate a hardware resource to software executed on predetermined hardware.

According to an embodiment, a resource management device is provided. The resource management device includes a processor configured to determine allocation of a resource of first hardware to sequential processes so that the sum of an absolute value of a difference between an output timing of at least one predetermined-number process among the sequential processes for the case where the first hardware executes the sequential processes and an output timing of the predetermined-number process for the case where second hardware that underperforms the first hardware executes the sequential processes is within a predetermined tolerance.

In the resource management device, the first hardware preferably includes a plurality of operating circuits. The processor is preferably further configured to determine the number of operating circuits to be allocated to the sequential processes among the plurality of operating circuits so that output timings of the sequential processes for the case where the first hardware executes the sequential processes are earlier than output timings of corresponding processes for the case where the second hardware executes the sequential processes, and that the number of the allocated operating circuits is minimized.

In the resource management device, the processor preferably determines at least the occupancy ratio of an individual operating circuit allocated to the sequential processes or the bandwidth of a communication channel between the first hardware and another device so that the sum of the absolute value of the difference between the output timing of the predetermined-number process for the case where the first hardware executes the sequential processes and the output timing of the predetermined-number process for the case where the second hardware executes the sequential processes is within the predetermined tolerance.

According to another embodiment, a method for resource management is provided. The method includes determining allocation of a resource of first hardware to sequential processes so that the sum of an absolute value of a difference between an output timing of at least one predetermined-number process among the sequential processes for the case where the first hardware executes the sequential processes and an output timing of the predetermined-number process for the case where second hardware that underperforms the first hardware executes the sequential processes is within a predetermined tolerance.

According to still another embodiment, a non-transitory recording medium that stores a computer program for resource management is provided. The computer program includes instructions causing a computer to execute a process including determining allocation of a resource of first hardware to sequential processes so that the sum of an absolute value of a difference between an output timing of at least one predetermined-number process among the sequential processes for the case where the first hardware executes the sequential processes and an output timing of the predetermined-number process for the case where second hardware that underperforms the first hardware executes the sequential processes is within a predetermined tolerance.

The resource management device according to the present disclosure has an advantageous effect of being able to appropriately allocate a hardware resource to software executed on predetermined hardware.

DESCRIPTION OF EMBODIMENTS

Figure 1:
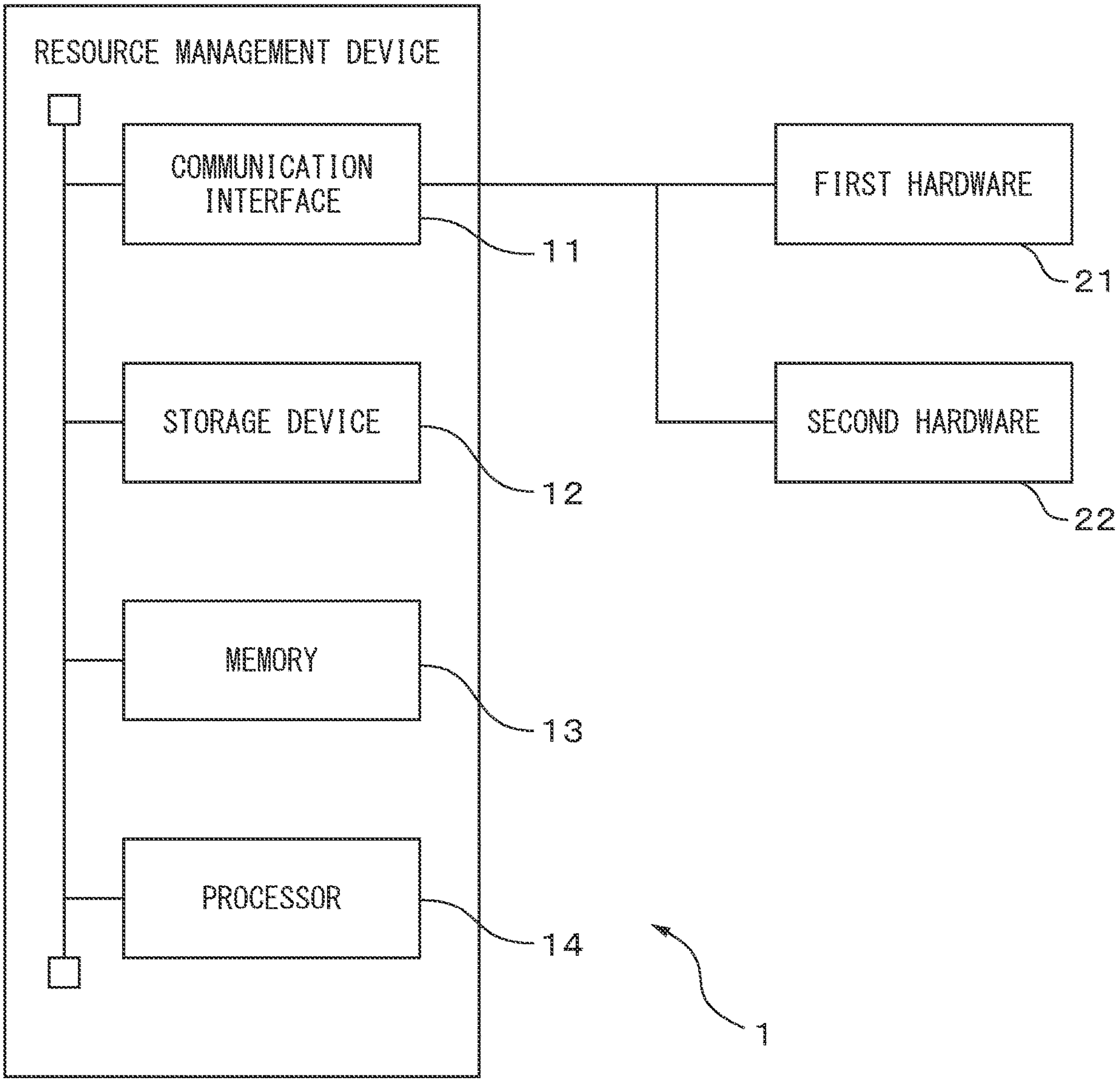
FIG. 1 illustrates the hardware configuration of a resource management device.

A resource management device, a method for resource management executed by the resource management device, and a computer program for resource management will now be described with reference to the attached drawings. The resource management device determines a hardware resource to be allocated to sequential processes of predetermined software, which is developed to run on hardware having lower performance (second hardware), for the case where the software is made to run on hardware having higher performance than the second hardware (first hardware). More specifically, the resource management device measures the difference between the output timing of the result of the sequential processes of the predetermined software for the case where the software runs on the first hardware and the output timing of the result of the sequential processes of the software for the case where the software runs on the second hardware. The resource management device determines allocation of a resource of the first hardware to the software so that the absolute value of the difference is within a tolerance.

In the following, the predetermined software that is a target for a resource management process will be referred to simply as the "target software" for convenience of description.

The first hardware and the second hardware can execute a predetermined operation to be executed in a predetermined use, and are each, for example, an electronic control unit (ECU) used for controlling a vehicle itself or a device mounted on a vehicle. However, the first and second hardware is not limited to an ECU, and only has to be capable of executing a predetermined operation.

The first hardware includes one or more operating units. The operating units may be, for example, individual operating circuits included in a processor, i.e., cores, or operating circuits provided separately from each other. The operating units are not limited to general-purpose ones, and may be dedicated operating circuits for executing a particular type of operation. The first hardware may further include a memory, and further include a communication interface for communicating with another device through a communication channel in conformity with a predetermined communication standard. Similarly, the second hardware includes at least one operating unit. The operating unit is not limited to general-purpose one, and may be, for example, a dedicated operating unit for executing a particular type of operation. The second hardware may further include a memory, and further include a communication interface for communicating with another device through a communication channel in conformity with a predetermined communication standard.

The first hardware outperforms the second hardware. More specifically, the first hardware may include more operating units than the second hardware. Alternatively, an operating unit included in the first hardware may execute more operations per unit time than an operating unit included in the second hardware. Alternatively, the first hardware may be able to use a broader communication band than the second hardware. In addition, the memory included in the first hardware may have a greater capacity than the memory included in the second hardware. Further, the reading and writing speeds of the memory included in the first hardware may be greater than those of the memory included in the second hardware.

For example, the target software runs on an ECU and relates to autonomous driving control of a vehicle. Examples of the sequential processes included in the target software include a process to detect a moving object in the vicinity of the vehicle from a signal of a sensor, such as a vehicle-mounted camera, representing the surroundings of the vehicle, a process to predict a future trajectory of the moving object based on the result of detection, and a process to generate a planned trajectory of the vehicle based on the result of prediction. The sequential processes may further include a process to determine the state of a driver based on images representing the driver obtained by a driver monitoring camera. The results of these processes are used for controlling the vehicle. For this reason, it is preferable that the output timings of the sequential processes of the target software be independent of the hardware on which the target software runs.

FIG. 1 illustrates the hardware configuration of the resource management device. The resource management device 1 includes a communication interface 11, a storage device 12, a memory 13, and a processor 14. The communication interface 11, the storage device 12, and the memory 13 are connected to the processor 14 via a signal line. The resource management device 1 may further include an input device, such as a keyboard and a mouse, and a display device, such as a liquid crystal display.

The communication interface 11, which is an example of a communication unit, includes an interface circuit for connecting the resource management device 1 to first hardware 21 and second hardware 22. The communication interface 11 receives, from the processor 14, data necessary for the target software to run on the first hardware 21 or the second hardware 22, one or more software modules constituting the target software, and commands, and outputs them to the first hardware 21 or the second hardware 22. The data includes, for example, various types of data to be processed by the target software, such as images and voices, and information for identifying a hardware resource to be allocated to the target software. Further, the communication interface 11 receives the result of a process of the target software and a measured value of the time required for the process from the first hardware 21 or the second hardware 22, and passes them to the processor 14.

The storage device 12, which is an example of a storage unit, includes, for example, a hard disk drive, or an optical medium and an access device therefor, and stores various types of data and information used in a resource management process. For example, the storage device 12 stores one or more software modules constituting the target software and data to be processed by the target software. The storage device 12 also stores software necessary for executing the target software on the first hardware 21, e.g., software for building a virtual machine that runs on the first hardware 21. In addition, the storage device 12 stores information indicating a resource of the second hardware 22 to be allocated to the sequential processes of the target software at execution of the target software on the second hardware 22 (hereafter referred to as "reference allocation information" for convenience of description). Examples of the reference allocation information include allocation information related to a memory capacity, the number of operating units, the occupancy ratio of the operating units, and a communication band. The storage device 12 may further store a computer program for the processor 14 to execute the resource management process, and information for identifying a hardware resource to be allocated to the target software.

The memory 13, which is another example of a storage unit, includes, for example, nonvolatile and volatile semiconductor memories. The memory 13 temporarily stores various types of data generated during execution of the resource management process.

The processor 14, which is an example of a control unit, includes one or more central processing units (CPUs) and a peripheral circuit thereof. The processor 14 may further include another operating circuit, such as a logic-arithmetic unit or an arithmetic unit, and executes the resource management process.

Figure 2:
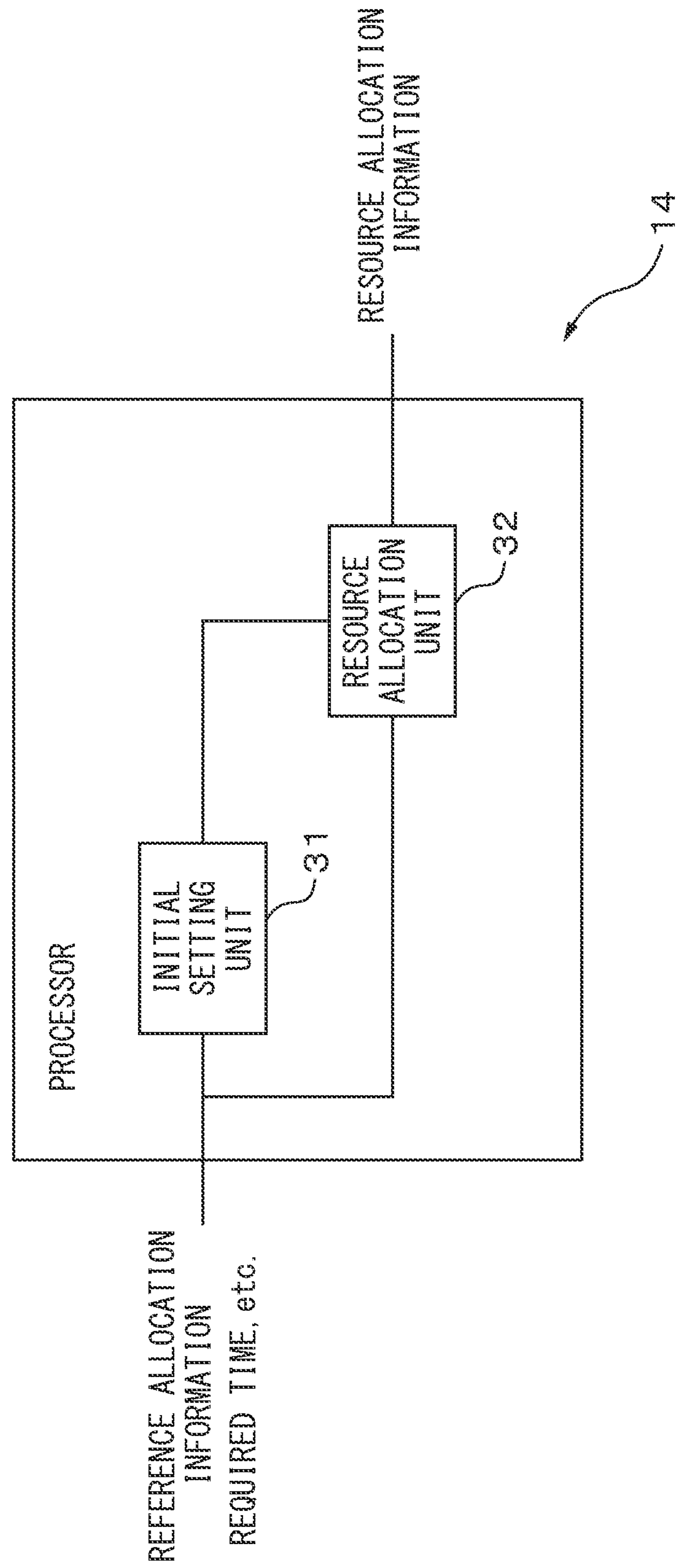
FIG. 2 is a functional block diagram of a processor, related to a resource management process.

FIG. 2 is a functional block diagram of the processor 14 related to the resource management process. The processor 14 includes an initial setting unit 31 and a resource allocation unit 32. These units are functional modules, for example, implemented by a computer program executed by the processor 14, or may be dedicated operating circuits provided in the processor 14. The processor 14 executes the resource management process to determine allocation of a resource of the first hardware 21 to the target software.

The initial setting unit 31 allocates, to the sequential processes of the target software, memory of the first hardware 21 whose capacity is the same as a memory capacity for the case where the second hardware 22 executes the sequential processes of the target software. The initial setting unit 31 identifies the memory capacity by referring to the reference allocation information stored in the storage device 12.

In addition, the initial setting unit 31 determines the minimum of the number of operating units such that the output timings of the sequential processes of the target software for the case where the first hardware 21 executes the processes are earlier than the output timings of corresponding processes for the case where the second hardware 22 executes the sequential processes of the target software. Then the initial setting unit 31 allocates the minimum number of operating units to the sequential processes of the target software. In this way, the initial setting unit 31 can allocate an appropriate number of operating units to the sequential processes of the target software while reducing the difference between the results of the sequential processes caused by the difference of hardware.

To achieve this, the initial setting unit 31 executes the sequential processes of the target software on the second hardware 22. To this end, the initial setting unit 31 allocates a hardware resource specified by the reference allocation information to the sequential processes of the target software. In addition, the initial setting unit 31 passes that data to be processed by the target software, which is read from the storage device 12, to the second hardware 22 via the communication interface 11. The initial setting unit 31 measures the time required to execute the sequential processes of the target software on the second hardware 22, and stores the measured time in the memory 13 as a reference process time. The initial setting unit 31 further measures the time required from the start of the sequential processes until the end of a predetermined-number process, and stores the measured time in the memory 13 as a predetermined-number reference process time.

In addition, the initial setting unit 31 executes the sequential processes of the target software on the first hardware 21. Specifically, the initial setting unit 31 measures the time required for the sequential processes of the target software while changing the number of operating units used for executing the target software among the operating units included in the first hardware 21. When software for executing the target software on the first hardware 21, e.g., software for building a virtual machine, is necessary, the initial setting unit 31 also executes the necessary software on the first hardware 21. The initial setting unit 31 may allocate the maximum allocatable hardware resource to the target software to measure the time required for the sequential processes of the target software. Alternatively, the initial setting unit 31 may allocate a hardware resource of the first hardware 21 equivalent to the hardware resource specified by the reference allocation information to the target software to measure the time required for the sequential processes of the target software. Then the initial setting unit 31 identifies the minimum of the number of operating units such that the time required for the sequential processes of the target software is shorter than the reference process time. The initial setting unit 31 determines to allocate the minimum number of operating units to the target software.

The resource allocation unit 32 determines a resource of the first hardware 21 to be allocated to the sequential processes of the target software at execution of the sequential processes on the first hardware 21. To this end, the resource allocation unit 32 measures the sum of the absolute values of the differences between the output timings of predetermined-number processes among the sequential processes of the target software for the case where the first hardware 21 executes the sequential processes and the output timings of the predetermined-number processes for the case where the second hardware 22 executes the sequential processes. The resource allocation unit 32 determines allocation of a resource of the first hardware 21 to the sequential processes of the target software so that the sum of the absolute values of the differences is within a predetermined tolerance.

In the present embodiment, the resource allocation unit 32 makes the sequential processes of the target software run on the first hardware 21, using the set number of operating units and the memory capacity set by the initial setting unit 31. To this end, when software for executing the target software on the first hardware 21, e.g., software for building a virtual machine, is necessary, the resource allocation unit 32 also executes the necessary software on the first hardware 21. The resource allocation unit 32 measures the required time from the start of the sequential processes until the end of at least one predetermined-number process among the sequential processes. The predetermined-number process may be, for example, the last process, but is not limited thereto and may be the first process or an intermediate process.

The resource allocation unit 32 calculates the absolute value of the difference between the measured required time and the predetermined-number reference process time, as an evaluation. When the evaluation is outside the predetermined tolerance, the resource allocation unit 32 changes the hardware resource used for executing the target software, and executes the sequential processes of the target software on the first hardware 21 again. Then the resource allocation unit 32 measures the required time from the start of the sequential processes until the end of the predetermined-number process among the sequential processes again.

The hardware resource to be changed is a resource other than the memory capacity and the number of operating units set by the initial setting unit 31, e.g., at least the occupancy ratio of an individual operating unit allocated to the sequential processes of the target software or the bandwidth of a communication channel between the first hardware 21 and another device.

The resource allocation unit 32 repeats the above-described processing until the evaluation falls within the predetermined tolerance. In this repetition, the resource allocation unit 32 may change the hardware resource to be allocated to the target software by a predetermined amount in the trial-and-error method or in accordance with an optimization technique, such as simulated annealing or the steepest-descent method.

When the evaluation is within the predetermined tolerance, the resource allocation unit 32 determines the hardware resource used by the target software at this time as the hardware resource to be allocated to the sequential processes of the target software. The resource allocation unit 32 then stores resource allocation information indicating the determined hardware resource in the storage device 12.

Figure 3A:
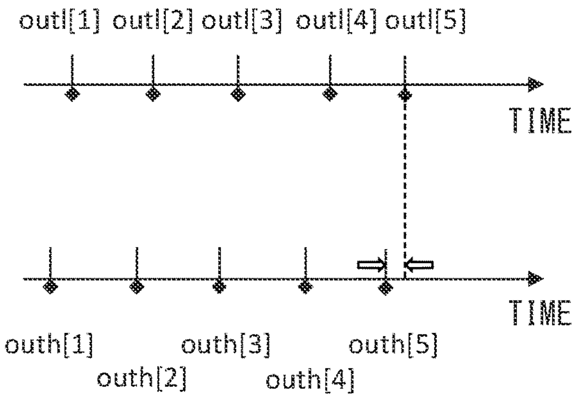
FIG. 3A is a diagram for explaining an example of an evaluation.
Figure 3B:
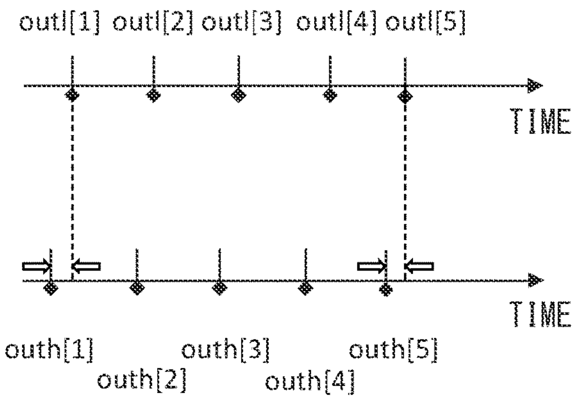
FIG. 3B is a diagram for explaining another example of an evaluation.
Figure 3C:
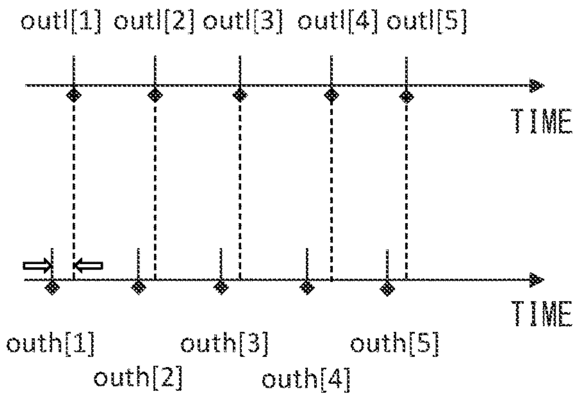
FIG. 3C is a diagram for explaining still another example of an evaluation.

FIGS. 3A to 3C are diagrams for explaining examples of the evaluation E. The abscissas in FIGS. 3A to 3C represent elapsed time. Symbols outl[i] (i=1, 2, . . . , n where n is the number of sequential processes of the target software) on the upper side indicate the output timings of the sequential processes of the target software for the case where the processes run on the second hardware 22. Symbols outh[i] (i=1, 2, . . . , n) on the lower side indicate the output timings of the sequential processes of the target software for the case where the processes run on the first hardware 21. In the examples illustrated in FIGS. 3A to 3C, the number n of sequential processes of the target software is 5.

In the example illustrated in FIG. 3A, the predetermined-number process used for calculating the evaluation E is the last process. In this case, the resource allocation unit 32 calculates the absolute value of the difference between the time from the start of operation until output of the result of the last process for the case where the sequential processes of the target software run on the first hardware 21 and the time from the start of operation until output of the result of the last process for the case where the sequential processes run on the second hardware 22, as the evaluation E In other words, the evaluation E is expressed by |outh[5]−outl[5]|. The resource allocation unit 32 determines the hardware resource used by the target software when the evaluation E is within the predetermined tolerance, as the hardware resource to be allocated to the sequential processes of the target software.

The evaluation is not limited to the one in the above example. For example, the resource allocation unit 32 may calculate the sum of the absolute values of the differences between the output timings of the results of two or more of the sequential processes of the target software for the case where the target software runs on the first hardware 21 and the output timings of these results for the case where the target software runs on the second hardware 22, as the evaluation E. For example, as illustrated in FIG. 3B, the evaluation E may be the sum of the absolute value of the difference between the output timings of the result of the first process |outh[1]−outl[1]| and the absolute value of the difference between the output timings of the result of the last process |outh[5]−outl[5]| among the sequential processes. Alternatively, as illustrated in FIG. 3C, the evaluation E may be the sum of the absolute values of the differences between the output timings of the results of the sequential processes τ|outh[i]−outl[i]. Alternatively, the times from the output timing of the first process among the sequential processes, instead of the start timing of operation of the target software, until the output timings of the subsequent processes may be calculated in calculation of the above-described evaluations E.

Figure 4:
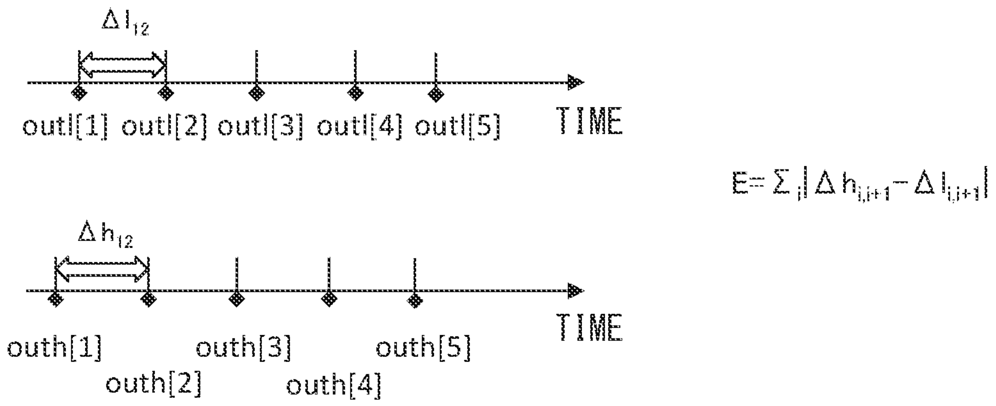
FIG. 4 is a diagram for explaining yet another example of an evaluation.

FIG. 4 is a diagram for explaining another example of the evaluation E. The abscissa in FIG. 4 represents elapsed time. Symbols outl[i] (i=1, 2, . . . , n where n is the number of sequential processes of the target software) on the upper side indicate the output timings of the sequential processes of the target software for the case where the processes run on the second hardware 22. Symbols outh[i] (i=1, 2, . . . , n) on the lower side indicate the output timings of the sequential processes of the target software for the case where the processes run on the first hardware 21. In the example illustrated in FIG. 4 also, the number n of sequential processes of the target software is 5.

In this example, the resource allocation unit 32 uses the intervals between the output timings of the results of two successive processes included in the sequential processes of the target software for calculating the evaluation E. For example, the resource allocation unit 32 calculates the sum of the absolute values of the differences between the interval between the output timings of the results of two successive processes among the sequential processes of the target software for the case where the target software runs on the first hardware 21 and the interval between these output timings for the case where the target software runs on the second hardware 22, as the evaluation E. In other words, the evaluation E is expressed by the following expression.

$$E=\Sigma|\Delta h_{i,i+1}-\Delta l_{i,i+1}|$$

$\Delta h_{i,i+1}$ is the interval between the output timings of the results of the i-th process and the (i+1)-th process for the case where the target software runs on the first hardware 21. Similarly, $\Delta l_{i,i+1}$ is the interval between the output timings of the results of the i-th process and the (i+1)-th process for the case where the target software runs on the second hardware 22.

The use of such an evaluation E enables the resource allocation unit 32 to determine a resource of the first hardware 21 to be allocated to the target software so that the interval between the output timings of the results of two successive processes is constant regardless of the hardware on which the target software runs. In the case where the evaluation is used, the sum of the absolute values of the differences between the output timings of the processes for the case where the target software runs on the first hardware 21 and the output timings for the case where the target software runs on the second hardware 22 also falls below a certain degree when the evaluation is within the predetermined tolerance.

Figure 5:
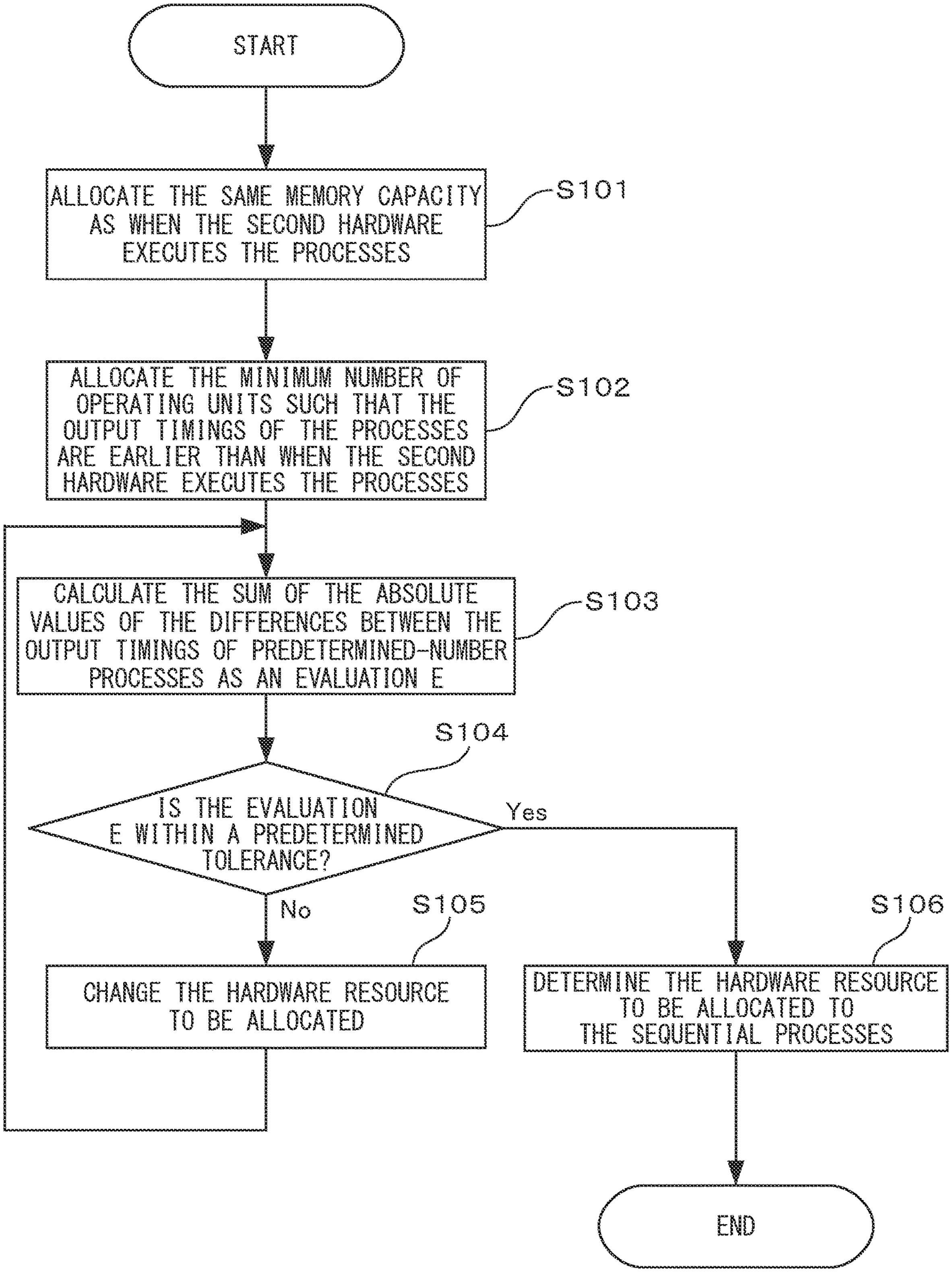
FIG. 5 is an operation flowchart of the resource management process.

FIG. 5 is an operation flowchart of the resource management process.

The initial setting unit 31 of the processor 14 allocates, to the sequential processes of the target software, memory of the first hardware 21 whose capacity is the same as a memory capacity for the case where the second hardware 22 executes the sequential processes of the target software (step S101). Further, the initial setting unit 31 determines the minimum of the number of operating units of the first hardware 21 such that the output timings of the processes are earlier than the output timings of corresponding processes for the case where the second hardware 22 executes the sequential processes of the target software. Then the initial setting unit 31 allocates the minimum number of operating units to the target software (step S102).

The resource allocation unit 32 of the processor 14 calculates the sum of the absolute values of the differences between the output timings of predetermined-number processes among the sequential processes of the target software for the case where the first hardware 21 executes the sequential processes, using a predetermined hardware resource, and the output timings of the predetermined-number processes for the case where the second hardware 22 executes the sequential processes, as an evaluation E (step S103). Then the resource allocation unit 32 determines whether the evaluation E is within a predetermined tolerance (step S104).

When the evaluation E is outside the predetermined tolerance (No in step S104), the resource allocation unit 32 changes the hardware resource to be allocated to the target software (step S105) and repeats the processing of step S103 and the subsequent steps.

When the evaluation E is within the predetermined tolerance (Yes in step S104), the resource allocation unit 32 determines the hardware resource used in step S103, as the hardware resource to be allocated to the sequential processes of the target software (step S106). Thereafter the processor 14 terminates the resource management process.

As described above, the resource management device determines allocation of a hardware resource to target software, which is developed to run on the second hardware having lower performance, for the case where the software is made to run on the first hardware having higher performance than the second hardware. In particular, the resource management device calculates the absolute value of the difference between the output timing of the result of the processes of the target software for the case where the software runs on the first hardware and the output timing of the result of the processes of the software for the case where the software runs on the second hardware, as an evaluation. The resource management device determines allocation of a resource of the first hardware to the software so that the evaluation is within a tolerance. In this way, the resource management device allocates a resource of the first hardware so that the output timings of the sequential processes of the target software are unchanged from the case of execution on the second hardware, and thus can reduce the variation in the output timings of the sequential processes depending on hardware. As a result, the resource management device can reduce defects in the case where the first hardware executes the sequential processes of the target software and where the result is used by other software. Thus, the resource management device can facilitate the use of developed software in development of a software application, and reduce the man-hours of the development of the software application.

According to a modified example, the resource allocation unit 32 may also determine the number of operating units to be used for executing the sequential processes of the target software among the operating units included in the first hardware 21, when determining a hardware resource to be allocated to the target software. In this case, when changing the hardware resource to be used, the resource allocation unit 32 also changes the number of operating units to be used for executing the sequential processes of the target software until the evaluation falls within the predetermined tolerance, similarly to determination of allocation of another hardware resource. Further, determination by the initial setting unit 31 of the number of operating units to be used for executing the target software is omitted.

The computer program for causing a computer to achieve the functions of the units included in the processor of the resource management device according to the embodiment or modified example may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

What is claimed is:

1. A resource management device comprising:
a first processor configured to:
determine allocation of a resource of a second processor to sequential processes, wherein:
the second processor comprises a plurality of first operating circuits,
a third processor underperforms the second processor,
the sequential processes have respective first output timings when the second processor executes the sequential processes and respective second output timings when the third processor executes the sequential processes, and
the allocation is determined so that a sum of absolute values of differences is within a predetermined tolerance, each difference being between a respective first value and a respective second value, each first value being based on at least one of the first output timings, and each second value being based on at least one of the second output timings; and
determine a number of the first operating circuits to be allocated to the sequential processes among the plurality of first operating circuits, the number being a minimized number such that, when the second processor executes the sequential processes using the minimized number of first operating circuits, each of the first output timings on which one of the first values is based is earlier than a corresponding one of the second output timings on which a corresponding one of the second values is based.

2. The resource management device according to claim 1, wherein the first processor determines at least an occupancy ratio of an individual first operating circuit allocated to the sequential processes performed by the second processor or a bandwidth of a communication channel between the second processor and another device such that the sum is within the predetermined tolerance.

3. The resource management device according to claim 1, wherein, for each difference, the first value is an interval between the first output timings of two successive processes among the sequential processes when the second processor executes the sequential processes, and the second value is an interval between the second output timings of the two successive processes when the third processor executes the sequential processes.

4. A method for resource management, comprising:
determining allocation of a resource of a first processor to sequential processes, wherein:
the first processor comprises a plurality of first operating circuits,
a second processor underperforms the first processor,
the sequential processes have respective first output timings when the first processor executes the sequential processes and respective second output timings when the second processor executes the sequential processes, and
the allocation is determined so that a sum of absolute values of differences is within a predetermined tolerance, each difference being between a respective first value and a respective second value, each first value being based on at least one of the first output timings, and each second value being based on at least one of the second output timings; and
determining a number of the first operating circuits to be allocated to the sequential processes among the plurality of first operating circuits, the number being a minimized number such that, when the first processor executes the sequential processes using the minimized number of first operating circuits, each of the first output timings on which one of the first values is based is earlier than a corresponding one of the second output timings on which a corresponding one of the second values is based.

5. A non-transitory recording medium that stores a computer program for resource management, the computer program causing a computer to execute a process comprising:
determining allocation of a resource of a first processor to-sequential processes, wherein:
the first processor comprises a plurality of first operating circuits,
a second processor underperforms the first processor, the sequential processes have respective first output timings when the first processor executes the sequential processes and respective second output timings when the second processor executes the sequential processes, and the allocation is determined so that a sum of absolute values of differences is within a predetermined tolerance, each difference being between a respective first value and a respective second value, each first value being based on at least one of the first output timings, and each second value being based on at least one of the second output timings; and determining a number of the first operating circuits to be allocated to the sequential processes among the plurality of first operating circuits, the number being a minimized number such that, when the first processor executes the sequential processes using the minimized number of first operating circuits, each of the first output timings on which one of the first values is based is earlier than a corresponding one of the second output timings on which a corresponding one of the second values is based.

* * * * *